United States Patent [19]

Komatsu et al.

[11] Patent Number: 4,918,155

[45] Date of Patent: Apr. 17, 1990

[54] PROCESS FOR PRODUCTION OF POLYCARBONATE

[75] Inventors: Takashi Komatsu; Eiichi Terada, both of Ichihara, Japan

[73] Assignee: Idemitsu Petrochemical Co., Ltd., Tokyo, Japan

[21] Appl. No.: 333,864

[22] Filed: Apr. 5, 1989

Related U.S. Application Data

[63] Continuation-in-part of Ser. No. 198,232, May 25, 1988, abandoned.

[30] Foreign Application Priority Data

Jun. 25, 1987 [JP] Japan ............................ 62-156490

[51] Int. Cl.$^4$ ................................................ C08G 63/68
[52] U.S. Cl. .................................... 528/202; 528/125; 528/174; 528/199; 528/204
[58] Field of Search ............... 528/202, 196, 125, 174, 528/204, 199

[56] References Cited

U.S. PATENT DOCUMENTS 3,751,400  8/1973  Crennan et al. ............ 260/47 XA
3,912,687 10/1975  Haupt et al. ................ 525/469 X
4,275,187  6/1981  Quinn et al. ................ 528/174

FOREIGN PATENT DOCUMENTS 699028 11/1967 Belgium .
2223412  2/1974 France .
2310370 12/1976 France .

OTHER PUBLICATIONS

Chemical Abstracts of Japan, vol. 81, No. 22, Dec. 2, 1974, p. 25, col. 2, Abstract No. 136938s, Columbus, Ohio, U.S.; & JP-A-74 35000 (Idemitsu Kosan Co., Ltd.) 30-03-1974.

*Primary Examiner*—Theodore E. Pertilla
*Attorney, Agent, or Firm*—Frishauf, Holtz, Goodman & Woodward

[57] ABSTRACT

A process for producing polycarbonate is disclosed, comprising reacting a halogenated bisphenol-containing organic dihydroxy compound and a carbonate-forming derivative in a liquid medium in the presence of pentahalogenophenol as a molecular weight modifier. This polycarbonate is superior in flame retardance, impact resistance and fluidity, and further in transparency.

12 Claims, No Drawings

PROCESS FOR PRODUCTION OF POLYCARBONATE

This application is a continuation-in-part, of application Ser. No. 07/198,232, filed May 25, 1988, now abandoned.

BACKGROUND OF THE INVENTION

1. Field of the Invention

The present invention relates to a process for production of polycarbonate and more particularly to a process for efficiently producing polycarbonate which is excellent in transparency and also in flame retardance, impact resistance and fluidity.

2. Description of Related Art

As polycarbonate having high flame retardance, for example, polycarbonate having a halogen-substituted phenoxy group (e.g., a pentabromophenoxy group, a tetrachlorophenoxy group, a tribromophenoxy group and the like) at the terminal thereof (Japanese Patent Publication No. 40715/1971), a copolymer of tetrahalogenobisphenolsulfone and bisphenol A (BPA), (Japanese Patent Application Laid-Open No. 123204/1976), polycarbonate having an aromatic monosulfonyl group at the terminal thereof (Japanese Patent Application Laid-Open No. 21497/1979), a copolymer of tetrabromobisphenol A and BPA (Japanese Patent Application Laid-Open No. 155233/1982), and polycarbonate having a sulfonic acid salt group at the terminal thereof (PCT Japanese Patent Application Laid-Open No. 501212/1985) are known.

These conventional polycarbonates, however, are not sufficiently satisfactory in impact resistance, fluidity or transparency although it is superior in flame retardance. That is, there has not been obtained polycarbonate which is superior in all of flame retardance, impact resisitance, fluidity, and transparency.

In addition, polycarbonate obtained using halogen-containing bisphenol and halogen-containing phenol as starting materials is known (Japanese Patent Application Laid-Open No. 136796/1976). This polycarbonate, however, is not sufficiently high in impact resistance and fluidity although it is produced using three or more different halogen-containing bisphenols as starting materials.

SUMMARY OF THE INVENTION

The present invention is intended to overcome the above problems of the prior art and an object of the present invention is to provide a process for production of polycarbonate which is superior in all of flame retardance, impact resistance, fluidity and transparency.

It has been found that if halogenated bisphenols is used as one component of the starting materials and penta-halogenophenol is used as a molecular weight modifier, there is obtained polycarbonate which is superior in flame retardance, impact resistance and fluidity, and further has sufficiently high transparency.

The present invention relates to a process for producing polycarbonate which comprises reacting bisphenol A and a carbonate-forming derivative to produce a polycarbonate oligomer of bisphenol A, reacting said polycarbonate oligomer, halogenated bisphenol represented by the general formula:

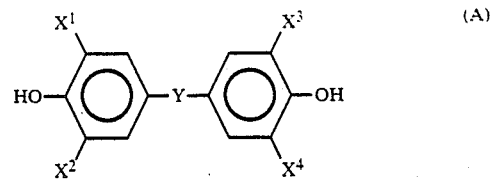

(wherein $X^1$, $X^2$, $X^3$ and $X^4$ are each a hydrogen atom or a halogen atom and Y is —O—, —S—, —SO—, —SO$_2$—, —CO—, an alkylene group having 1 to 4 carbon atoms, or an alkylidene group having 2 to 5 carbon atoms, provided that at least one of $X^1$ to $X^4$ is a halogen atom) and pentahalogenophenol as a molecular weight modifier to produce a polycarbonate cooligomer, and then reacting said polycarbonate cooligomer and bisphenol A.

The present invention also relates to a process for producing polycarbonate which comprises reacting bisphenol A, halogenated bisphenol represented by the general formula described above, pentahalogenophenol as a molecular weight modifier, and a carbonate-forming derivative to produce a polycarbonate cooligomer, and then reacting said polycarbonate cooligomer and bisphenol A.

DESCRIPTION OF PREFERRED EMBODIMENTS

In the process of the present invention, organic dihydroxy compounds containing halogenated bisphenols are used as one component of the starting materials.

Various halogenated bisphenols can be used; usually, compounds represented by the general formula:

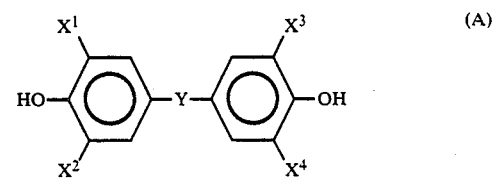

(wherein Y is —O—, —S—, —SO—, SO$_2$—, —CO—, an alkylene group having 1 to 4 carbon atoms, or an alkylidene group having 2 to 5 carbon atoms, and $X^1$ to $X^4$ are each a hydrogen atom or halogen atom, provided at least one of $X^1$ to $X^4$ is a halogen atom) are used.

Representative examples of the halogenated bisphenols represented by the general formula (A) are 2,2-bis (3,5-dibromo-4-hydroxyphenyl) propane (commonly called tetrabromobisphenol A); 2,2-bis(3,5-dichloro-4-hydroxyphenyl) propane; bis (2-bromo-4-hydroxyphenyl) methane; bis (3,5dibromo-4-hydroxyphenyl) sulfone; bis (3,5-dibromo-4-hydroxyphenol) sulfide; bis(3,5-dibromo-4-hydroxyphenyl) sulfoxide; bis (3,5-dibromo-4-hydroxyphenyl) ether; and bis (3,5-dibromo-4-hydroxyphenyl) ketone. Of these compounds, tetrahalogenobisphenols such as tetrabromobisphenol A, bis (3,5-dibromo-4-hydroxyphenol) sulfone and the like are particularly suitable.

As organic dihydroxy compounds other than the above halogenated bisphenols, those capable of forming polycarbonate through the reaction with carbonate-forming derivatives can be used. Various organic dihydroxy compounds are used depending on the purpose of use. Usually, bisphenols represented by the general formula:

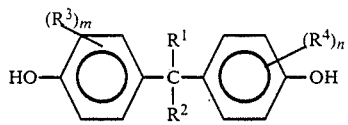

(B)

(wherein $R^1$ and $R^2$ are each an alkyl group having 1 to 7 carbon atoms, $R^3$ and $R^4$ are each a hydrogen atom or an alkyl group having 1 to 4 carbon atoms, and m and n are each an integer of 1 to 4) are used.

Representative examples of the bisphenols represented by the general formula (B) are 2,2-bis (4-hydroxyphenyl) propane (commonly called bisphenol A), (1) A method in which an alkaline aqueous solution of bisphenol A and an organic solvent, e.g. mythylene chloride are mixed and a carbonate-forming derivative, e.g. phosgene is blown thereinto the produce an oligomer of bisphenol A, an alkaline aqueous solution of pentahalogenophenol represented by the general formula (C) is added to a mixture of the above oligomer, an alkaline aqueous solution of halogenated bisphenol represented by the general formula (A) and tertiary amine (e.g. triethylamine) and subjected to preliminary condensation to obtain a polycarbonate cooligomer having a repeating unit comprising the bisphenol A and the halogenated bisphenol and having a number average molecular weight of 500 to 5,000, and an alkaline aqueous solution of bisphenol A and an organic solvent, e.g. methylene chloride are added to the above polycarbonate cooligomer and subjected to polycondensation to obtain the desired polycarbonate.

(2) A method in which a carbonate-forming derivative, e.g. phosgene is blown into a mixture of an alkaline aqueous solution of bisphenol A, an alkaline aqueous solution of halogenated bisphenol represented by the general formula (A), an alkaline aqueous solution of pentahalogenophenol represented by the general formula (a), an organic solvent, e.g. methylene chloride and tertiary amine (e.g. triethylamine) to obtain a polycarbonate cooligober having a repeating unit comprising bisphenol A and halogenated bisphenol and having a number average molecular weight of 500 to 5,000, and an alkaline aqueous solution of bisphenol A and an organic solvent, e.g. methylene chloride are added to the above polycarbonate cooligomer and subjected to polycondensation to obtain the desired polycarbonate.

In the present invention, both of the above methods (1) and (2) can be employed. The point in common with the methods (1) and (2) is that a polycarbonate cooligomer having a repeating unit comprising bisphenol A and halogenated bisphenol is previously prepared, and bisphenol A is added thereto and subjected to polycondensation.

In methods other than the above methods (1) and (2), for example, if a polycarbonate cooligomer is not previously prepared and phosgene is blown into a mixture of all starting materials to produce polycarbonate, the molecular weight distribution of the polycarbonate is broadened, undesirably leading to an increase in the YI value of the resulting molding.

The organic dihydroxy compound to be used as one component of the starting materials may be halogenated bisphenol as described above. Usually the amount of the halogenated bisphenol represented by the general formula (A) being used is chosen so that the halogen atom content of the resulting polycarbonate is 5 to 10% by weight, especially 5.3 to 9.0% by weight.

In the process of the present invention, in producing polycarbonate from the aforementioned halogenated bisphenol-containing organic dihydroxy compound and carbonate-forming derivative, it is necessary to add pentahalogenophenol as a molecular weight modifier to the reaction system. This pentahalogenophenol is represented by the general formula (C):

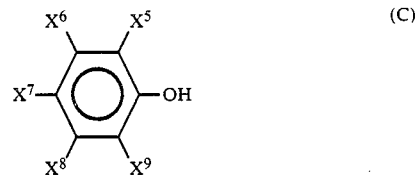

(C)

(wherein $X^5$ to $X^9$ are each a halogen atom and may be the same or different).

Representative examples of the pentahalogenophenol are pentabromophenol, pentachlorophenol, and pentafluorophenol. The amount of the pentahalogenophenol used varies depending on the molecular weight of polycarbonate to be produced and cannot be determined unconditionally. In general, it suffices that pentahalogenophenol is added in an amount sufficient to act as a molecular weight modifier, and also that care is taken so that the halogen atom content of polycarbonate, resulting from the halogenated bisphenol and pentahalogenophenol is within the range of 5 to 10% by weight. In addition to the above requirements, it is necessary for the pentahalogenophenol to be added in an amount sufficient to bond to the terminals of the resulting polycarbonate, or a somewhat greater amount than that.

In accordance with the process of the present invention, polycarbonate is produced in liquid medium by known techniques such as the interfacial polymerization method and the pyridine method.

For example, a halogenated bisphenol-containing organic dihydroxy compound dissolved in an aqueous alkali solution (e.g., an aqueous sodium hydroxide solution, an aqueous potassium hydroxide solution, and an aqueous sodium carbonate solution) is added to an inert organic solvent (e.g., methylene chloride, chloroform, chlorobenzene and carbon teterachloride), and a carbonate-forming derivative, (e.g., phosgene) is blown thereinto to proceed interfacial polymerization. In this reaction, as a molecular weight modifier, pentahalogenophenol is added previously or at a stage that the reaction has proceeded to a certain extent. It is also effective that tertiary amines such as triethylamine are added to the reaction system as a catalyst (dehydrohalogenation agent). Since the reaction is exothermic, it is preferred to cool the reaction system with water or ice. Furthermore, since the reaction system becomes acidic as the reaction proceeds, it is preferred that the pH be maintained at 10 or more by adding an alkali while measuring with a pH meter.

In accordance with the pyridine method, a halogenated bisphenol-containing organic dihydroxy compound and pentahalogenophenol are dissolved in pyridine or a mixed solvent of pyridine and an intert solvent, and a carbonate-forming derivative (e.g., phosgene) is blown in the resulting solution, whereupon the desired polycarbonate is formed. The amounts of the pentahalogenophenol and carbonate-forming derivative (e.g., phosgene) being introduced specify the degree of polymerization, that is, molecular weight of the resulting polycarbonate. Therefore, the amounts of the pentahalogenophenol and carbonate-forming derivatives added are determined appropriately depending on the purpose of use. In blowing the carbonate-forming derivative (e.g., phosgene), the rate of the carbonate-forming derivative blown per hour is controlled appropriately to make the total amount blown at the end of the reaction equal to the feed amount necessary for the reaction.

On pouring the resulting reaction mixture to a large amount of a precipitating agent such as methanol, the desired polycarbonate is precipitated.

The process of the present invention is carried out as described above. More specifically, the following methods are preferably employed.

(1) A method in which an alkaline aqueous solution of halogenated bisphenol represented by the general formula (A), an alkaline aqueous solution of bisphenol (organic dihydroxy compound) represented by the general formula (B), an alkaline aqueous solution of pentahalogenophenol represented by the general formula (C), an organic solvent (e.g., methylene chloride), and teritary amine (e.g., triethylamine) are mixed, and a carbonate-forming derivative (e.g., phosgene) is blown into the resulting mixture to cause polycondensation, whereby the desired polycabonate is obtained.

(2) A method in which an alkaline aqueous solution of bisphenol (organic dihydroxy compound) represented by the general formula (B), an alkaline aqueous solution of pentahalogenophenol represented by the general formula (C), an organic solvent (e.g., methylene chloride), and tertiary amine (e.g., triethylamine) are mixed; a carbonate-forming derivative (e.g., phosgene) is blown into the resulting mixture to obtatin an oligomer; an alkaline aqueous solution of halogenated bisphenol represented by the general formula (A) and/or an alkaline aqueous solution of bisphenol represented by the general formula (B), an organic solvent (e.g., methylene chloride), and tertiary amine are added to the oligomer; and the resulting mixture is subjected to polycondensation, whereby the desired polycarbonate is obtained.

(3) A method in which an oligomer of bisphenol represented by the general formula (B) which has been previously formed, an alkaline aqueous solution of halogenated bisphenol represented by the general formula (A) and tertiary amine are mixed; an alkaline aqueous solution of pentahalogenophenol represented by the general formula (C) is added to the above mixture and the resulting mixture is subjected to preliminary condensation; and further an alkaline aqueous solution of bisphenol represented by the general formula (B) and an organic solvent (e.g., methylene chloride) are added and the resulting mixture is subjected to polycondensation, whereby the desired polycarbonate is obtained.

As the carbonate-forming derivative to be used in the above reaction, as well as phosgene, various compounds such as bromophosgene, disphenyl carbonate, di-p-tolyl carbonate, phenyl-p-tolyl carbonate, di-p-chlorophenyl carbonate, dinaphtyl carbonate and the like can be used. Furthermore, a monohydric phenol such as p-tert-butylphenol can be added to the reaction system.

In accordance with the process of the present invention, there is obtained polycarbonate containing a repeating unit represented by the general formula:

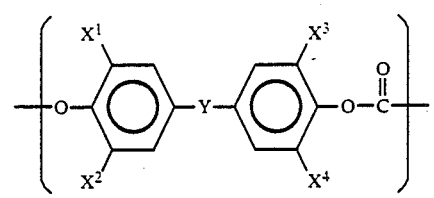

(wherein Y and $X^1$ and $X^4$ are the same as described above), resulting from the reaction of halogenated bisphenol represented by the general formula (A) and carbonate-forming derivative (e.g., phosgene), a repeating unit represented by the general formula:

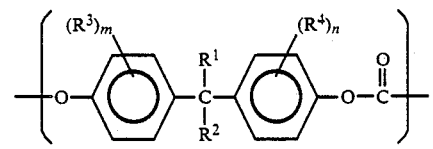

(wherein $R^1$ to $R^4$, m and n are the same as described above), resulting from the reaction of bisphenol represented by the general formula (B) and carbonate-forming derivative (e.g., phosgene), and a pentahalogenophenoxy group bonded to the terminal thereof. The molar ratio of the repeating unit (I) to the repeating unit (II) in the formed polycarbonate is varied and depends on the halogenated bisphenol content of the organic dihydroxy compound to be used as one component of the starting materials. Usually the total amount of the halogen atom in the repeating unit (I) and the halogen atom in the pentahalogenophenoxy group as the terminal group (the halogen atom content) is chosen within the range of 5 to 10% by weight, preferably 5.3 to 9.0% by weight based on the total weight of the polycarbonate.

If the halogen atom content of the polycarbonate is less than 5% by weight, flame retardance is poor. On the other hand, if it is in excess of 10% by weight, impact resistance is insufficiently low.

The ratio of the amount of the halogen atom contained in the repeating unit (I) to the amount of the halogen atom contained in the pentahalogenophenoxy group is not critical, and it suffices that the total amounts of the halogen atoms contained in the repeating unit (I) and the pentahologenophenoxy group is within the above specified range. Usually the amount of the halogen atom contained in the repeating unit (I) is 1 to 7% by weight based on the total weight of the polycarbonate, and the amount of the halogen atom contained in the pentahalogenophenoxy group is 1 to 8% by weight based on the total weight of the polycarbonate.

In the polycarbonate obtained by the process of the present invention, a pentahalogenophenoxy group represented by the general formula:

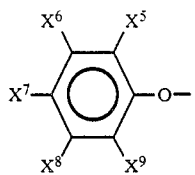

(wherein $X^5$ to $X^9$ are the same as described above) is linked to the end of the polycarbonate, particularly to both ends thereof.

In connection with the degree of polymerization of the polycarbonate obtained by the process of the present invention, the viscosity average molecular weight is preferably at least 10,000 and more preferably 15,000 to 25,000. If the viscosity average molecular weight is less than 10,000, mechanical properties such as impact resistance are not satisfactory.

The polycarbonate obtained by the process of the present invention contains the above repeating units (I) and (II), and has the pentahalogenophenoxy group at the terminal thereof, and it may be a random copolymer, a block copolymer, an alternate copolymer or the like. The flow value of the polycarbonate is not limited, and is preferably at least $5 \times 10^{-2}$ ml/sec.

The polycarbonate may contain a small amount of a repeating unit or repeating units other than the repeating units (I) and (II) in the molecular chain thereof.

The process of the present invention enables to efficiently produce polycarbonate having a pentahalogenophenoxy group at the terminal thereof, which is superior in flame retardance, is good in fludity, is of sufficiently high impact resistance, and is superior in transparency. More specifically there can be obtained polycarbonate which is of such flame retardance that UL94 (Underwriter's Laboratories Subject 94) using a test piece of 1/16 inch (thickness) is V-0, has an Izod Impact Value (notched, ductile failure at ordinary temperature) of at least 50 kg.cm/cm as a measure of impact resistance, has the flow value of at least $4 \times 10^{-2}$ ml/sec so that the fluidity is capable of forming a thin film molding, and which is transparent.

Polycarbonate produced by the process of the present invention can be widely used in production of various industrial products such as home electric appliances, office automation (OA) apparaturses, construction materials and the like.

The present invention is described in greater detail with reference to the following examples.

PREPARATION EXAMPLE

Preparation of Polycarbonate Oligomer of Bisphenol A 91 g of bisphenol A (BPA), 330 ml of methylene chloride, and 560 ml of a 2.0 normal (N) aqueous sodium hydroxide solution were placed in a 2-liter flask equipped with a stirrer, and then phosgene was blown thereinto for 70 minutes while stirring and cooling on a water bath. On allowing the resulting reaction mixture to stand at room temperature, a methylene chloride solution of oligomer was formed as a lower layer. The concentration of oligomer in the oligomer solution was 320 g/liter, and the number average molecular weight was 850 and the chloro-formate concentration was 0.7 mol/liter.

EXAMPLE 1

8 liters (L) of the polycarbonate oligomer obtained in Preparation Example, 600 ml of an aqueous sodium hydroxide solution of tetrabromobisphenol A (TBA) (tetrabromobisphenol) A 99.3 g (0.187 mol), sodium hydroxide 21.9 g, water 500 ml), and 4.4 g (0.043 mol) of triethylamine were placed in a 50-liter container equipped with a stirrer, and then stirred at 500 rpm. After 10 minutes, an aqueous sodium hydroxide solution of pentabromophenol (PBP) (pentabromophenol 184 g 0.377 mol), sodium hydroxide 30.1 g, water 10.3 L) is added to the reaction system, and the resulting mixture was reacted with each other while stirring for 50 minutes to produce polycarboniate cooligomer having repating units comprising BPA and TBA. The number average molecular weight of the cooligomer was 1300 and the chloroformate concentration was 0.55 mol/liter. Then, to the reaction mixture. 4.2 L of an aqueous sodium hydroxide solution of bisphenol A (bisphenol A 439 g (1.93 mol), sodium hydroxide 289 g, water 3.7 L), 11.9 g of p-tert-butylphenol, and 6 L of methylene chloride were added, and the resulting mixture was stirred.

After stirring for 60 minutes, the resulting reaction mixture was separated into an aqueous layer and a methylene chloride layer containing the copolymer formed.

Unreacted monomer was precipitated by making the aqueous layer acidic. The resulting precipitate was recovered by filtration and dried.

The bromine content of the dried material was measured, after alkali decomposition, by the Volhard method.

The methylene chloride layer was washed with water, and acid (0.1N hydrochloric acid), and water in this order. Upon removal of the methylene chloride from the methylene chloride layer at 40° C. under reduced pressure, a white powder (copolymer) was obtained. This powder was dried at 120° C. for one day and night, and melted and pelletized by the use of an extruder. The glass transition temperature (Tg) of the pellet was 154.1° C. The viscosity average molecular weight was 18,400, and the molecular weight distribution as determined by gel permeation chromatography was such a distribution that had a single peak at the above value.

The pellets were injection molded at a temperature of 280° C. and an injection pressure of 56 kg/cm² by the use of an injection molding machine to produce a test piece. This test piece was measured for Izod impact resistance and flame resistance, and its transparency was measured with the eye. The flow value of the pellet was measured with a flow tester.

YI value of the pellet was measured according to JIS K 7103.

The bromine content of the pellet was 6.8% by weight. The bromine content was measured, after alkali decomposition, by the Volhard method. The results are shown in Table 2.

EXAMPLES 2 TO 6 AND COMPARATIVE EXAMPLES 1 TO 3

The procedure of Example 1 was repeated wherein the amounts of the aqueous sodium hydroxide solution of tetrabromobisphenol A (TBA), the aqueous sodium hydroxide solution of pentabromophenol (PBP) and the p-tert-butylphenol were changed as shown in Table 1. The results are shown in Table 2.

COMPARATIVE EXAMPLE 5

Into a tubular reactor having an inner diameter of 10 mm and a length of 10 m through an orifice were introduced an aqueous solution of bisphenol A (prepared by dissolving 60 kg of bisphenol A in 400 L of a 5% aqueous sodium hydroxide solution), an aqueous solution of tetrabromobisphenol A (TBA) prepared by dissolving 76 kg of tetrabromobisphenol A in 400 liters of a 4% aqueous sodium hydroxide solution), an aqueous solution of pentabromophenol (prepared by dissolving 82 kg of pentabromophenol in 400 liters of a 4% aqueous sodium hydroxide solution), methylene chloride and an aqueous solution of triethylamine (concentration 33 g/L) at flow rates of 138 L/hr, 4.6 L/hr, 7,8 L/hr, 50 L/hr and 100 ml/hr, respectively. Phosgene was blown thereinto in parallel at a flow rate of 11 kg/hr to react. The tubular reactor as used herein was a jacketed tube, and the discharge temperature of the reaction mixture was maintained at 25° C. by passing cooling water through the jacket portion. After the reaction in the tubular reactor, the reaction was continued for 3 hours in a 100-liter vessel type reactor. After the reaction, the polymer solution was treated in the same manner as in Example 1 to obtain a white powder, and this powder was analyzed in the same manner as in Example 1. The results are shown in Table 2

TABLE 1

| | Aqueous Tetrabromo-bisphenol A Solution* | | | Aqueous Pentabromo-phenol Solution | | | p-tert-Butyl phenol (g) | Number Average Molecular Weight*** | Bromine Content of Unreacted Monomer**** (wt %) |
|---|---|---|---|---|---|---|---|---|---|
| | TBA (g) | NaOH (g) | Water (ml) | PBP (g) | NaOH (g) | Water (ml) | | | |
| Example 1 | 99.3 | 21.9 | 500 | 184 | 30.1 | 1030 | 11.9 | 1300 | 0.1> |
| Example 2 | 52.5 | 11.6 | 260 | 222 | 36.4 | 1250 | 0 | 1210 | 0.1> |
| Example 3 | 51.4 | 11.3 | 260 | 160 | 26.6 | 910 | 18.5 | 1240 | 0.1> |
| Example 4 | 84.7 | 18.7 | 430 | 232 | 38.0 | 1300 | 0 | 1260 | 0.1> |
| Example 5 | 262 | 57.8 | 1320 | 40.6 | 6.6 | 230 | 56.2 | 2850 | 0.1> |
| Example 6 | 145 | 31.9 | 730 | 231 | 37.8 | 1290 | 0 | 1830 | 0.1> |
| Comparative Example 1 | 276 | 60.9 | 1390 | 0 | 0 | 0 | 34.1 | 2880 | 0.1> |
| Comparative Example 2 | 345 | 76.1 | 1740 | 0 | 0 | 0 | 58.1 | 3210 | 0.1> |
| Comparative Example 3 | 415 | 91.5 | 2090 | 0 | 0 | 0 | 58.1 | 3570 | 0.1> |
| Example 7 | 54.5** | 11.6 | 260 | 222 | 36.4 | 1250 | 0 | 1280 | 0.1> |
| Example 8 | 88.1** | 18.7 | 430 | 232 | 38.0 | 1300 | 0 | 1290 | 0.1> |
| Comparative Example 4 | 359** | 76.1 | 1740 | 0 | 0 | 0 | 58.1 | 3250 | 0.1> |

*In Examples 7, 8 and Comparative Example 4, aqueous TBS solution is used.
**Amount of TBS is shown.
***Polycarbonate Cooligomer having repeating units comprising BPA and TBA.
****Measured by Valhald method.

TABLE 2

| | Bromine Atom Content (wt %)*1 | Bromine Composition Ratio TBA/PBP*1 (wt %/wt %) | Viscosity Average Molecular Weight*2 | Glass Transition Temperature (°C.) | Flow Value*3 (ml/s) | Izod Impact Value*4 (notched) (kg · cm/cm) | Flame Retardance*5 | Transparency | YI value |
|---|---|---|---|---|---|---|---|---|---|
| Example 1 | 6.8 | 1.9/4.9 | 18,400 | 154.1 | 6.5 × 10<sup>-2</sup> | 75 | V-0 | Transparent | 3.8 |
| Example 2 | 6.9 | 1.0/5.9 | 17,700 | 153.8 | 8.0 × 10<sup>-2</sup> | 74 | V-0 | Transparent | 4.2 |
| Example 3 | 5.4 | 1.0/4.4 | 19,800 | 155.0 | 6.1 × 10<sup>-2</sup> | 72 | V-0 | Transparent | 3.9 |
| Example 4 | 7.7 | 1.6/6.1 | 17,900 | 154.2 | 7.2 × 10<sup>-2</sup> | 62 | V-0 | Transparent | 4.4 |
| Example 5 | 6.2 | 5.1/1.1 | 20,300 | 153.8 | 7.9 × 10<sup>-2</sup> | 79 | V-0 | Transparent | 3.2 |
| Example 6 | 8.7 | 2.7/6.0 | 18,100 | 156.1 | 6.8 × 10<sup>-2</sup> | 52 | V-0 | Transparent | 3.8 |
| Comparative Example 5 | 7.1 | 1.1/6.0 | 17,500 | 154.0 | 7.1 × 10<sup>-2</sup> | 72 | V-0 | Transparent | 10.3 |
| Comparative Example 1 | 5.2 | 5.2/0 | 27,200 | 160.2 | 1.5 × 10<sup>-2</sup> | 100 | V-2 | Transparent | 4.1 |
| Comparative Example 2 | 6.6 | 6.6/0 | 19,200 | 157.3 | 7.5 × 10<sup>-2</sup> | 11 | V-0 | Transparent | 3.3 |
| Comparative Example 3 | 7.5 | 7.5/0 | 18,500 | 157.5 | 8.0 × 10<sup>-2</sup> | 12 | V-0 | Transparent | 4.3 |
| Example 7 | 6.8 | 1.1/5.7*6 | 17,900 | 154.1 | 7.6 × 10<sup>-2</sup> | 69 | V-0 | Transparent | 3.7 |
| Example 8 | 7.6 | 1.8/5.8*6 | 17,600 | 154.7 | 7.9 × 10<sup>-2</sup> | 58 | V-0 | Transparent | 4.0 |
| Comparative Example 4 | 6.6 | 6.6/0*6 | 18,900 | 159.3 | 7.1 × 10<sup>-2</sup> | 10 | V-0 | Transparent | 3.3 |
| Example 9 | 6.8 | 1.1/5.7 | 17,800 | 154.0 | 7.8 × 10<sup>-2</sup> | 78 | V-0 | Transparent | 3.6 |

*1 The bromine content of the polycarbonate, resulting from TBA and PBP, was determined by calculation. The bromine content of the polymer was determined, after alkali decomposition, by the Volhard method.
*2 The viscosity average molecular weight (Mv) was determined by calculating from a viscosity of a methylene chloride solution as measured at 20° C. by the use of a Ubbellohde viscometer.
*3 The flow value was measured according to JIS-K-7210 (load 160 kg/cm²).
*4 The Izod impact value was determined according to JIS-K-7110 using a test piece having a thickness of ⅛ inch.
*5 The flame retardance was measured according to UL 94 (Underwriter's Laboratory Subject 94) using a test piece of 1/16 inch in thickness.
*6 TBS/PBP instead of TBA/PBP is shown.

EXAMPLE 7

8 liters of the polycarbonate oligomer obtained in Preparation Example, 320 ml of an aqueous sodium hydroxide solution of bis (3-5-dibromo-4-hydroxyphenyl) sulfone (TBS) (bis (3-5-dibromo-4-hydroxyphenyl) sulfone 54.6 g (0.096 mol), sodium hydroxide 11.6 g, water 260 ml), and 4.4 g (0.043 mol) of triethylamine were placed in a 50-liter container equipped with a stirrer, and then stirred at 500 rpm. After 10 minutes, an aqueous sodium hydroxide solution of pentabromophenol (PBP) (pentabromophenol 222 1 g (0.454 mol), sodium hydroxide 36.4 g, water 1.25 L) is added to the reaction system, and the resulting mixture was stirred. After 50 minutes, 4.2 L of an aqueous sodium solution of bisphenol A (bisphenol A 439 g (1.93 mol), sodium hydroxide 289 g, water 3.7 L), and 6 L of methylene chloride were added, and the resulting mixture was stirred.

After stirring for 60 minutes, the resulting reaction mixture was separated into an aqueous layer and a methylene chloride layer containing the copolymer formed.

The methylene chloride layer was washed with water, and acid (0.1N hydrochloric acid), and water in this order. Upon removal of the methylene chloride from the methylene chloride layer at 40° C. under reduced pressure, a white powder (copolymer) was obtained. This powder was dried at 120° C. for one day and night, and melted and pelletized by the use of an extruder. The glass transition temperature (Tg) of the pellet was 154.1° C. The viscosity average molecular weight was 17,900, and the molecular weight distribution as determined by gel permeation chromatography was such a distribution that had a single peak at the above value.

The pellets were injection molded at a temperature of 280° C. and an injecton pressure of 56 kg/cm$^2$ by the use of an injection molding machine to produce a test piece. This test piece was measured for Izod impact resistance and flame resistance, and its transparency was measured with the eye. The flow value of the pellet was measured with a flow tester.

The bromine content of the pellet was 6.8% by weight. The bromine content was measured, after alkali decomposition, by the Volhard method. The results are shown in Table 2.

EXAMPLE 8 AND COMPARATIVE EXAMPLE 4

The same procedure as in Example 8 was repeated wherein the amounts of the aqueous sodium hydroxide solution of bis (3,5-dibromo-4-hydroxyphenyl) sulfone (TBS) and the aqueous sodium hydroxide solution of pentabromophenol (PBP) were changed as shown in Table 1. The results are shown in Table 2.

EXAMPLE 9

2.0 kg of bisphenol A (BPA), 52.5 g of tetrabromobisphenol A (TBA), 222 g of pentabromophenol (PBP), 12.5 liters of a 2.0N aqueous solution of sodium hydroxide, 4.4 g of triethylamine and 7.5 liters of methylene chloride were placed in a 30-liters flask equipped with a stirrer, and phosgene was blown thereinto while cooling on a water bath till the pH reached 7. On allowing the reaction mixture to stand at room temperature, a methylene chloride solution of an oligomer was separated as the under layer. In this oligomer solution, the oligomer concentration was 330 g/l, the number average molecular weight was 1,240, and the concentration of the chloroformate group was 0.65 mol/l.

8 liters of the oligomer solution, a sodium hydroxide solution of BPA (consisting of 533 g of BPA, 312 g of sodium hydroxide and 4.0 liters of water), 5.2 liters of methylene chloride and 4.4 g of triethylamine were placed in a 50-liters vessel equipped with a stirrer, and stirred for one hour.

Thereafter, the same operation as in Example 1 was carried out.

The results are shown in Table 2.

What is claimed is:

1. A process for producing polycarbonate which comprises reacting bisphenol A and a carbonate-forming derivative to produce a polycarbonate oligomer of bisphenol A, reacting said polycarbonate oligomer, halogenated bisphenol represented by the general formula:

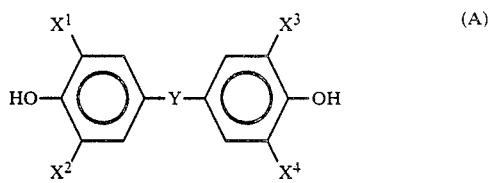

wherein $X^1$, $X^2$, $X^3$ and $X^4$ are each a hydrogen atom or a halogen atom and Y is —O—, —S—, —SO—, —SO$_2$—, —CO—, an alkylene group having 1 to 4 carbon atoms, or an alkylidene group having 2 to 5 carbon atoms, provided that at least one of $X^1$ to $X^4$ is a halogen atom and pentahalogenophenol as a molecular weight modifier to produce a polycarbonate cooligomer, and then reacting said polycarbonate cooligomer and bisphenol A.

2. The process as claimed in claim 1 wherein the halogen content of the polycarbonate is 5 to 10% by weight.

3. The process as claimed in claim 1 comprising using as the carbonate-forming derivative, a member of the group consisting of phosgene, bromophosgene, disphenyl carbonate, di-p-tolyl carbonate, phenyl-p-chlorophenyl carbonate and dinaphthyl carbonate.

4. The process as claimed in claim 3 comprising using as the halogenated bisphenol, a member of the group consisting of 2,2-bis (3,5-dibromo-4-hydroxyphenyl) propane (commonly called tetrabromobisphenol A); 2,2-bis(3,5-dichloro-4-hydroxyphenyl) propane; bis (2-bromo-4-hydroxyphenyl) methane; bis (3,5-dibromo-4-hydroxyphenyl) sufone; bis (3,5-dibromo-4-hydroxyphenyl) sulfide; bis(3,5-dibromo-4-hydroxyphenyl) sulfoxide, bis (3,5-dibromo-4-hydroxyphenyl) ether; and bis (3,5-dibromo-4-hydroxyphenyl) ketone.

5. The process as claimed in claim 4 comprising using as the pentahalogenophenol used is a compound of the formula:

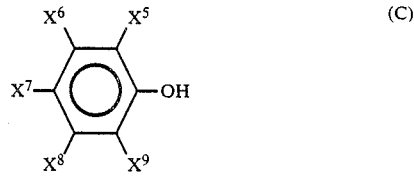

wherein $X^5$ to $X^9$ are each bromine, chlorine or fluorine and may be the same or different.

6. The process as claimed in claim 5 wherein the halogenated bisphenol used, is tetrabromobisphenol A or bis(3,5dibromo-hydroxyphenyl) sulfone.

7. The process as claimed in claim 1 comprising using as the halogenated bisphenol, a member of the group consisting of 2,2-bis (3,5-dibromo-4-hydroxyphenyl) propane (commonly called tetrabromobisphenol A); 2,2-bis(3,5-dichloro-4-hydroxyphenyl) propane; bis (2-bromo-4-hydroxyphenyl) methane; bis (3,5-dibromo-4-hydroxyphenyl) sufone; bis (3,5-dibromo-4-hydroxyphenyl) sulfide; bis(3,5-dibromo-4-hydroxyphenyl) sulfoxide, bis (3,5-dibromo-4-hydroxyphenyl) ether; and bis (3,5-dibromo-4-hydroxyphenyl) ketone.

8. The process as claimed in claim 7 comprising using as the pentahalogenophenol used is a compound of the formula:

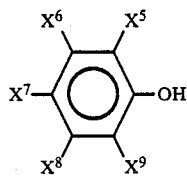
(C)

wherein $X^5$ to $X^9$ are each bromine, chlorine or fluorine and may be the same or different.

9. The process as claimed in claim 8 wherein the halogenated bisphenol used, is tetrabromobisphenol A or bis (3,5-dibromo-hydroxyphenyl) sulfone.

10. The process as claimed in claim 1 comprising using as the pentahalogenophenol used is a compound of the formula:

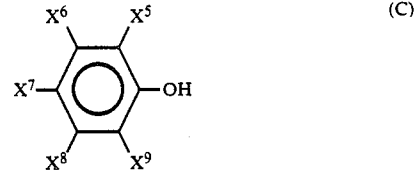

wherein $X^5$ to $X^9$ are each bromine, chlorine or fluorine and may be the same or different.

11. The process as claimed in claim 1 wherein the halogenated bisphenol used, is tetrabromobisphenol A or bis(3,5-dibromo-hydroxyphenyl) sulfone.

12. The process as claimed in claim 1 comprising using as the pentahalogenanopenol, a pentachlorophenol, pentabromophenol or pentafluorophenol.

* * * * *